UNITED STATES PATENT OFFICE.

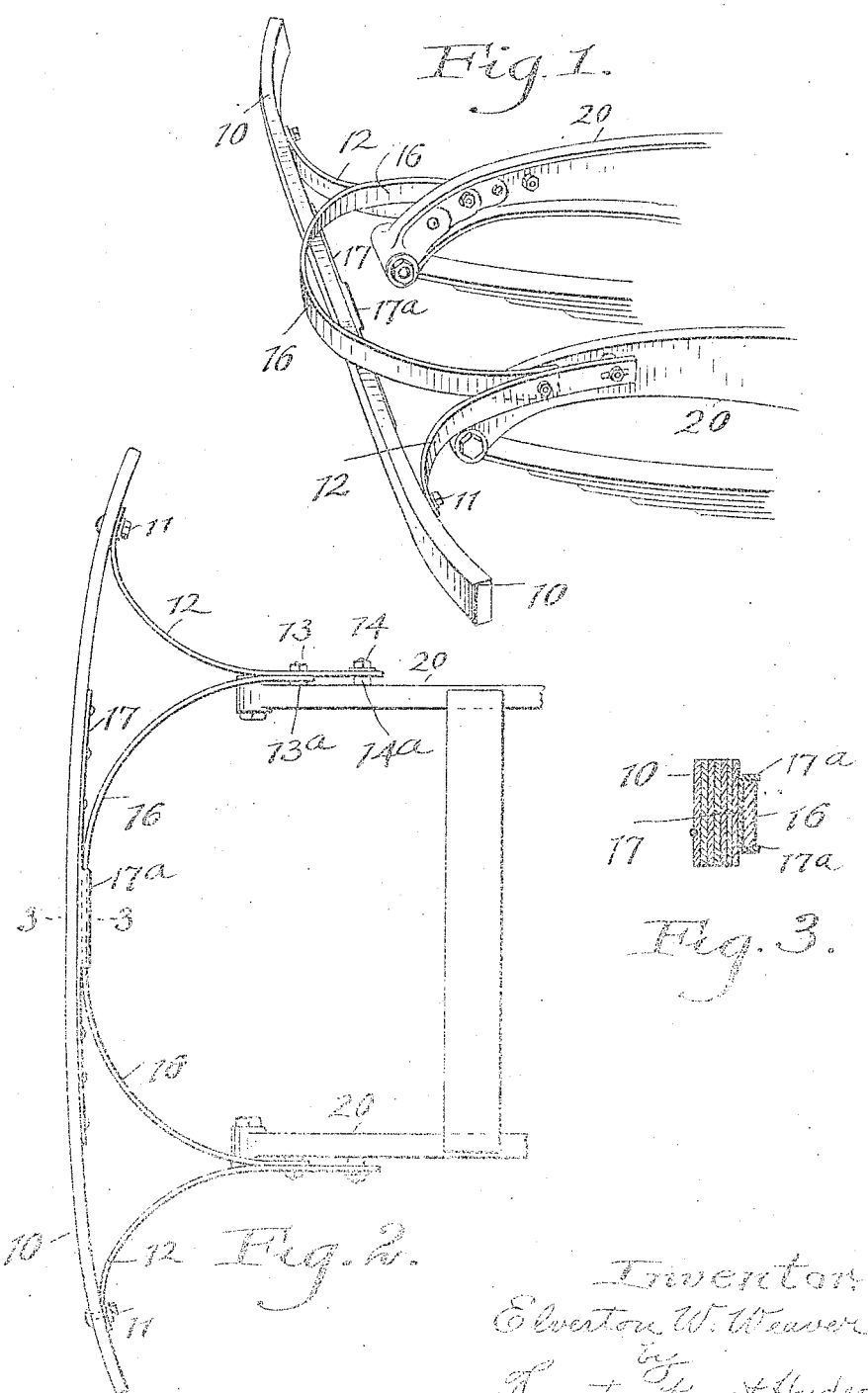

ELVERTON W. WEAVER, OF CLEVELAND HEIGHTS, OHIO.

BUMPER-BAR.

1,380,616.   Specification of Letters Patent.   Patented June 7, 1921.

Application filed February 16, 1921. Serial No. 445,438.

*To all whom it may concern:*

Be it known that I, ELVERTON W. WEAVER, a citizen of the United States, residing at Cleveland Heights, in the county of Cuyahoga and State of Ohio, have invented a certain new and useful Improvement in Bumper-Bars, of which the following is a full, clear, and exact description.

This invention is an automobile bumper embodying novel features of construction which result in a light weight bumper having high efficiency in withstanding, without breaking, the blows and shocks to which such devices are liable to be subjected in use, and high efficiency in minimizing the chances of injury to the automobile to which it is attached.

The invention consists in the construction and combination of parts shown in the drawings and hereinafter described and definitely pointed out in the appended claims.

In the drawings, Figure 1 is a perspective view of the bumper showing the normal relation of the parts thereof just before they have been put into their final relative positions; Fig. 2 is a plan view of the bumper in condition for use; Fig. 3 is a vertical sectional view in the plane of line 3—3 on Fig. 2.

The bumper includes a resilient bumper bar 10 which may be and preferably is made of laminated wood. The purpose of using the laminated wood bumper bar is to produce a structure of light weight which will have sufficient strength for the purpose. This bumper bar may, however, be made of other suitable material, as for example, steel. It is normally substantially straight, except for the fact that near its ends it is slightly curved rearward.

Two bracket bars 12 are employed to connect this bumper bar with the side members 20 of an automobile frame. Each of these bracket bars has its front end curved outward, that is, away from the automobile frame member to which its rear end is attached, and toward the adjacent end of the bumper bar, the outer part of each bracket bar being shaped to conform to the rear face of the bumper bar and being attached thereto by a bolt 11. The rear end of each bracket bar is substantially parallel to the outer face of the associated side frame member to which it is secured by two bolts 13 and 14, which pass through the bracket bar and side frame member. Each bracket bar may, however, be spaced away from the adjacent frame member by washers 13$^a$ and 14$^a$ which embrace the bolt between the bumper bar and side frame member, when that is necessary to prevent the bracket bars or arch brace from contacting with projections such as rivet heads on the side frame members.

16 represents a resilient arch-shaped reinforcing brace. This is formed by bending a flat steel bar into substantial U-shape. The ends of this arch brace are secured to the two bracket bars and to the automobile frame members by means of the same bolts 13 before mentioned, said bolts being in front of bolts 14. The rear ends of the brace lie between the bracket bars and the washers 13$^a$. The length of this arch brace is such that when the parts are connected together to the extent above described, and before the bolts 13 and 14 are tightened up the front middle part of the brace will project a substantial distance beyond the bumper bar and may rest upon it as a convenience preparatory to arranging the parts in operative final relation to each other and to the automobile. Under such conditions the parts described are somewhat loosely connected to each other and to the automobile by means of the bolts 13 and 14, and the arch brace is pivoted to the two bracket bars.

The front middle part of the arch brace must now be pushed rearward and the middle of the bumper bar must be pulled forward and the middle part of the arch brace moved down behind the bumper bar and into engagement with the rear face thereof. Both the bumper bar and the arch brace are thereby distorted and put under stress or tension whereby both are rendered more efficient in resisting the stresses and blows to which they may be subjected and better able to withstand them without breaking than would be the case if these parts were not so stressed or tensioned.

When the parts have been brought to the relative positions described the bolts 13 and 14 are tightened up.

In order to insure that the bumper bar and arch brace shall remain in the described operative relation without having to weaken either by holes which would be required by bolts, one or the other of said parts, preferably the bumper bar, is provided near the point of contact between them with horizontal parallel flanges 17ª, between which the other of said parts will lie as in a groove. In the construction shown a thin steel plate 17 is secured by screws to the rear face of the bumper bar, which if the bumper bar is made of wood does not materially weaken it. Near the middle of this steel plate the upper and lower edges thereof are bent rearward in parallel relation to form the flanges 17ª which provide a groove into which the bent front end of the arch brace will project, whereby said arch brace will be held in the described operative relation with the bumper bar.

The distorted and tensioned condition of the bumper bar and arch brace add very materially to the strength and shock absorbing qualities of the structure. It likewise greatly reduces the chance that the side frame members of the automobile frame will be bent inward if the bumper bar is subjected to a blow of sufficient force to bend it and the brace bar rearward to any great extent; that is to say, to an extent such as carries the bumper bar substantially behind the position in which it normally would stand if it were not "bowed" forward. If by a blow the bumper bar is bent backward beyond this position the reaction of the arch brace is such that the ends thereof apply considerable force to the side frame members of the automobile tending to bend them outward. At the same time the bracket bars apply to the automobile side frame members compensating pressure tending to bend them inward. These two forces being in opposite directions minimize the chance that the side frame members of the automobile shall be bent.

It will of course be understood that such terms as front, rear, and the like, as herein used are relative terms only; and that although as used they are correct when referring to a bumper bar attached to the front end of an automobile, they would have to be used inversely if used in connection with the described structure when applied to the rear end of an automobile.

Having described my invention, I claim:—

1. An automobile bumper comprising, in combination, a resilient bumper bar, two bracket bars which are connected thereto and are the means through which the bumper bar may be connected to the side frame members of an automobile, and a resilient arch brace disposed between the two bracket bars and connected therewith near its ends,—the middle part of said arch brace being in engagement with the rear face of the bumper bar,—and said arch brace being of such length that both the bumper bar and arch brace are under stress or tension as the result of their engagement.

2. An automobile bumper comprising a resilient bumper bar, two bracket bars whose front ends are bent outward and are fastened to the bumper bar and whose rear ends are substantially parallel and are adapted to be connected with the side frame members of an automobile, a resilient arch brace whose middle part lies behind and is in contact with the bumper bar and whose ends are connected to the respective brace bars at points such that the bumper bar and the arch brace are distorted and put under stress or tension.

3. An automobile bumper comprising, in combination, a resilient bumper bar, two bracket bars which are connected thereto and are the means through which the bumper bar may be connected to the side frame members of an automobile, and a resilient arch brace disposed between the two bracket bars and connected therewith near its ends,—the middle part of said arch brace being in engagement with the rear face of the bumper bar, and said arch brace being of such length that both the bumper bar and arch brace are under stress or tension as the result of their engagement, the bumper bar and the arch brace at their point of engagement being provided with flanges attached to one of said parts lying above and below the other part.

4. The combination with the two side frame members of an automobile frame, of a resilient bumper bar, two bracket bars which at their rear ends are secured to the automobile frame members respectively at their front ends and are curved outward and are attached to the bumper bar, two bolts associated with each bracket, an automobile side frame member passing through both to connect them together, a resilient arch brace each rear end of which lies between the associated side frame member and bracket bar, and is connected to both by one bolt only,—the same being the forward one of the bolts which connect the bracket bars to the side frame member, the middle part of the arch brace being held in contact with the rear face of the bumper bar, and said arch brace being of such length that both the bumper bar and brace are substantially distorted and are held under stress or tension as the result of such engagement.

5. The combination with the two side frame members of an automobile frame, of a resilient bumper bar made of wood, two bracket bars which at their rear ends are secured to the automobile frame members respectively and at their front ends are curved outward and are attached to the bumper bar, a resilient arch brace each rear end of which lies between the associated side frame member and bracket bar and is connected to both, a thin metal plate secured to the rear face of the bumper bar and having rearwardly extended flanges on its upper and lower edges near the middle of said plate, the middle part of the arch brace being in engagement with said plate between the flanges thereof, and the arch brace being of such length that both it and the bumper bar are distorted and put under stress or tension as the result of such engagement, and the arch brace is held in the stated position by said flanges.

6. An automobile bumper body comprising, in combination, a resilient wood bumper bar, two metal bracket bars which are connected thereto and are the means through which the bumper bar may be connected to the side frame members of an automobile, a spring metal arch brace disposed between the two bracket bars and connected therewith near its ends, and having its middle portion in engagement with the rear face of the bumper bar, and means to preserve said engagement.

7. An automobile bumper body comprising, in combination, a resilient wood bumper bar, two metal bracket bars which are connected thereto and are the means through which the bumper bar may be connected to the side frame members of an automobile, a spring metal arch brace disposed between the two bracket bars and connected therewith near its ends, a metal plate fixed to the rear face of the bumper bar,—the arched brace being of such length that its middle portion will engage said metal plate, and means to preserve said engagement.

In testimony whereof I hereunto affix my signature.

ELVERTON W. WEAVER.